Patented Mar. 7, 1933

1,900,072

UNITED STATES PATENT OFFICE

JOSEPH F. QUINN, OF BURLINGAME, CALIFORNIA, ASSIGNOR TO GEO. W. CASWELL CO., OF SAN FRANCISCO, CALIFORNIA, A CORPORATION OF CALIFORNIA

COFFEE ROASTING PROCESS

No Drawing. Original application filed January 16, 1929, Serial No. 332,829. Divided and this application filed April 12, 1930. Serial No. 443,924.

This invention relates to the roasting of coffee and forms a process division of my co-pending application for coffee roasting machine filed under Serial No. 332,829 on January 16, 1929, patented May 27, 1930, No. 1,759,955, and has for its objects improvements in coffee roasting processes whereby a more uniform product is had, a product is obtained having a better flavor, and of a lower caffeine and tannic acid content than with other roasting processes.

Before taking up a description of the invention it would be well to state that coffee is generally roasted in revolving cylindrical drums, and usually there are two cylinders one within the other, with the coffee to be roasted placed in the space between the cylinders. The cylinders are perforated with fine holes and gas burners are positioned within the inner cylinder to produce the necessary roasting heat. These gas burners generate products of combustion which are vented through the perforations of the cylinders for discharge to an outer housing in which the cylinders revolve, and from the housing they pass to the stack. The products of combustion therefore come at all times in direct contact with the coffee beans, in fact pass through the mass of revolving coffee continually during the roasting process and therefore communicate objectionable matter to the coffee for absorption thereby, thus tending to contaminate the same and impart objectionable flavor to the resulting product.

Besides the above objection is the difficulty of maintaining an even heat due to the varying quality or pressures of the gas, and the humidity and temperature of the air of combustion supplying the flame. In fact the conditions vary so much that absolute timing of the roasting period under such conditions is very unusual in coffee roasting practice, but where best results are the aim, reliance is placed on the expert attendant roaster who judges by color only when the roasting is complete.

When the roasting is adjusted complete, the gas flame is extinguished and a quantity of cold water is injected into the mass of revolving coffee beans in the roaster, so as to quickly check the roasting process. This water turns at once into steam since the temperature of the roasted beans is about 350° Fahrenheit, and this brings in another variable adapted to influence flavor and uniformity of quality.

I have discovered that the uncertainties of roasting with gas and the objectionable contamination of the coffee resulting therefrom may be overcome by the method of the invention to be disclosed.

Briefly described my invention comprises continuously passing a thin flat layer of coffee beans, preferably about one bean in depth, along a surface while tumbling them over and over, and maintaining a plane of radiant heat just above and close to the beans during their travel, so that all parts of each bean are exposed to the same degree of heat from above, and all for a time period so that upon discharge from the plane of radiant heat the roasting will be complete, and since the traveling layer of beans is substantially one layer of beans in thickness, the roasting effect is instantaneously checked at the end of the treatment without the necessity of introducing water as in the gas process.

Also, the plane of radiant heat is preferably derived from an overlying network or multiplicity of electrical heating units associated with heat radiating and reflecting surfaces so that the heat will be directed downwardly, and since no heat is generated below the layer of beans there are no moist vapors passing upward through the beans to have any cooking tendency upon them, as do the hot moist vapors of the common process of coffee roasting with gas flame used in the manner described, or the natural moist vapors which would be generated in a relatively large body or mass of the beans being roasted in bulk by any process of applying heat thereto.

The result of the process described gives a coffee of exceptionally high quality, every bean of which is individually roasted by being turned over and over for exposure to the downwardly directed rays of radiant heat, entirely free from contamination of any foreign agencies whatsoever, or the carrying away in a violent uprush of moist vapors of its valuable volatilized constituents, and thus yielding a product which may be continuously produced of uniformly unvarying quality without expert attention.

In carrying out my invention I may employ any suitable apparatus, such for instance as the angularly arranged shaker-table arrangement with layer of electrical heating units closely overlying it, all as fully shown and described in my copending patent application aforesaid, or any form of gas-heated apparatus may be used in which the heat is directed downwardly against a substantially horizontal flat layer of coffee beans which are tumbled about as they are carried along. The important points to be observed being that the length of travel of the beans should be such that with one passage under the heating elements the beans will be thoroughly roasted.

When an overhanging sheet of electrical heating elements is used, the elements should be kept at a dull red heat or at a temperature lying between 400 and 500 degrees F. and the layer of beans spaced about two inches below and passing slowly along, preferably on a screen, while being violently tumbled about by any suitable means, and in a time to be completely roasted by radiant heat above, thus avoiding all danger of producing surface burns or uneven flavors.

I have found that a layer of coffee beans passing along on wire belts or wire mesh shaker tables an inch or two below a layer of dull red hot electric heating elements, all enclosed in suitable housings to conserve heat, will be perfectly roasted in from 7 to 10 minutes, and hence with a total length of travel of say from 20 to 30 feet a speed is attained which represents a very large output per day.

Coffee roasted in this manner has been found to possess a superior flavor and to be at all times under exact control so that absolute uniformity may be depended upon, instead of relying on the uncertain human element as heretofore. Besides this, remarkable as it may seem, chemical tests which I have had made of such coffee roasted quickly by radiant heat only shows a pronounced decrease in tannic acid and caffeine content thus contributing a long-looked for benefit to the public in its use of coffee as a beverage.

Having thus described my invention, I claim:—

1. The method of roasting coffee which comprises continually passing a flat layer of coffee beans of substantially one bean in depth along under a downwardly directed heat radiating surface only for a time period to effect roasting while continually turning the beans over and over and under conditions permitting free escape of hot vapors.

2. The method of roasting coffee which comprises continually passing a flat layer of coffee beans of substantially one bean in depth along a path and turning them over and over while subjecting them to the action of substantially radiant heat only until roasted, all under conditions permitting free escape of hot vapors.

JOSEPH F. QUINN.